United States Patent [19]
Adams et al.

[11] 3,832,974
[45] Sept. 3, 1974

[54] FLUIDIZED BED COATING APPARATUS

[75] Inventors: Gerald E. Adams, Mishawaka; Robert O. Borton; Alfred J. Dabrowski, Jr., both of South Bend; Vernon A. Falkenau; James H. Flood, both of Mishawaka, all of Ind.

[73] Assignee: Uniroyal, Inc., New York, N.Y.

[22] Filed: Apr. 25, 1972

[21] Appl. No.: 247,500

[52] U.S. Cl............. 118/408, 117/21, 117/DIG. 6, 118/DIG. 5, 117/6
[51] Int. Cl.......... B05b 7/12, B05b 7/14, B05b 7/24
[58] Field of Search................ 117/21, 6, DIG. 6; 118/404, 408, 429, DIG. 5

[56] References Cited
UNITED STATES PATENTS
2,815,550  12/1957  Valyi.......................... 117/DIG. 6
3,004,861  10/1961  Davis............................... 118/429
3,061,941  11/1962  Goy et al. ...................... 117/DIG. 6
3,061,941  11/1962  Goy et al. ...................... 117/DIG. 6
3,199,491  8/1965  Bader et al. ................... 117/DIG. 6

Primary Examiner—William D. Martin
Assistant Examiner—Shrive P. Beck
Attorney, Agent, or Firm—Robert J. Patterson, Esq.

[57] ABSTRACT

Apparatus and method for effecting fluidized bed coating of a surface of an article, such as a mold for an auto mat, wherein an outside wall of a fluidized bed chamber containing a fluidized bed of powdered thermoplastic coating material has an opening into which the article is inserted thereby sealing the opening.

4 Claims, 6 Drawing Figures

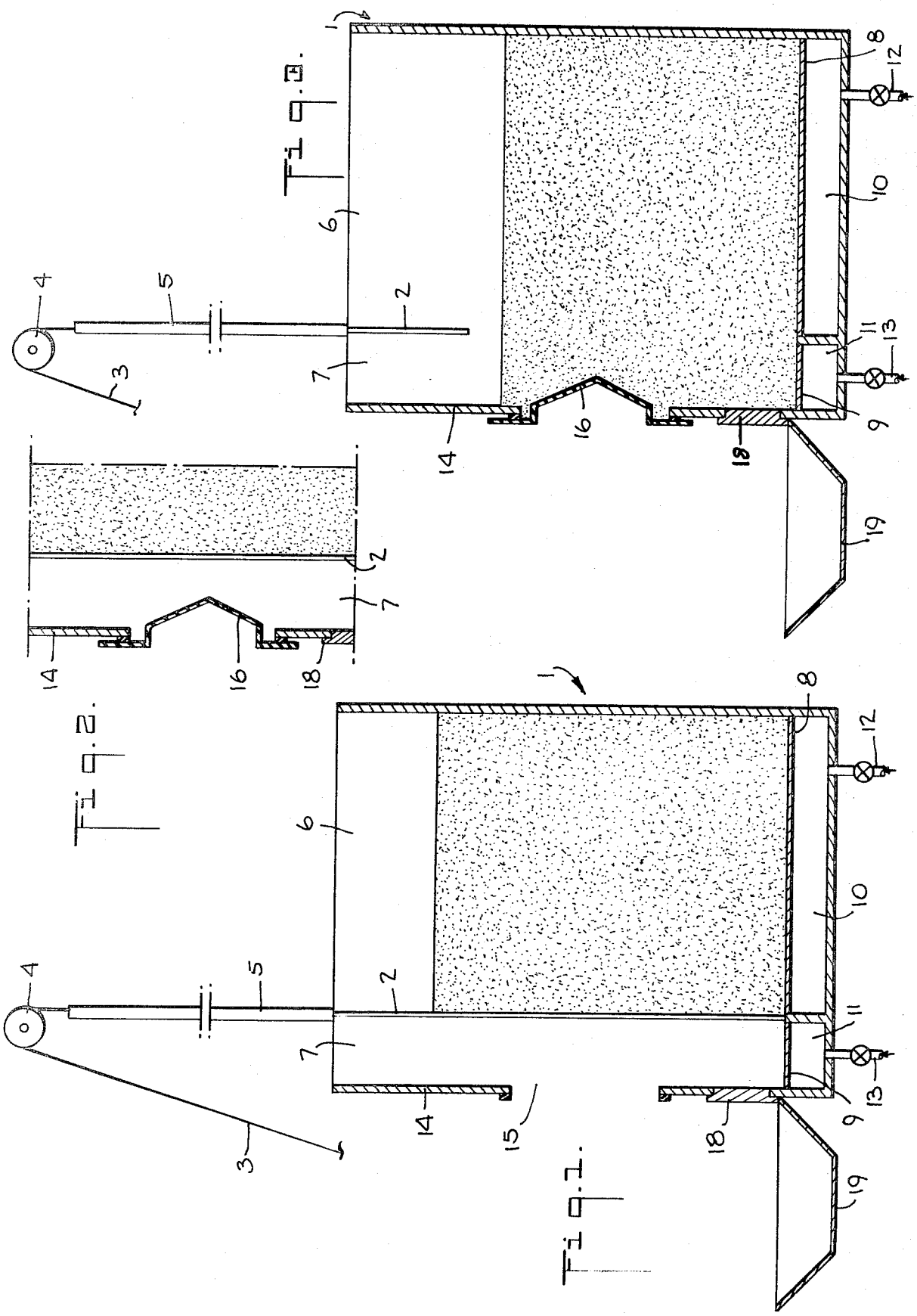

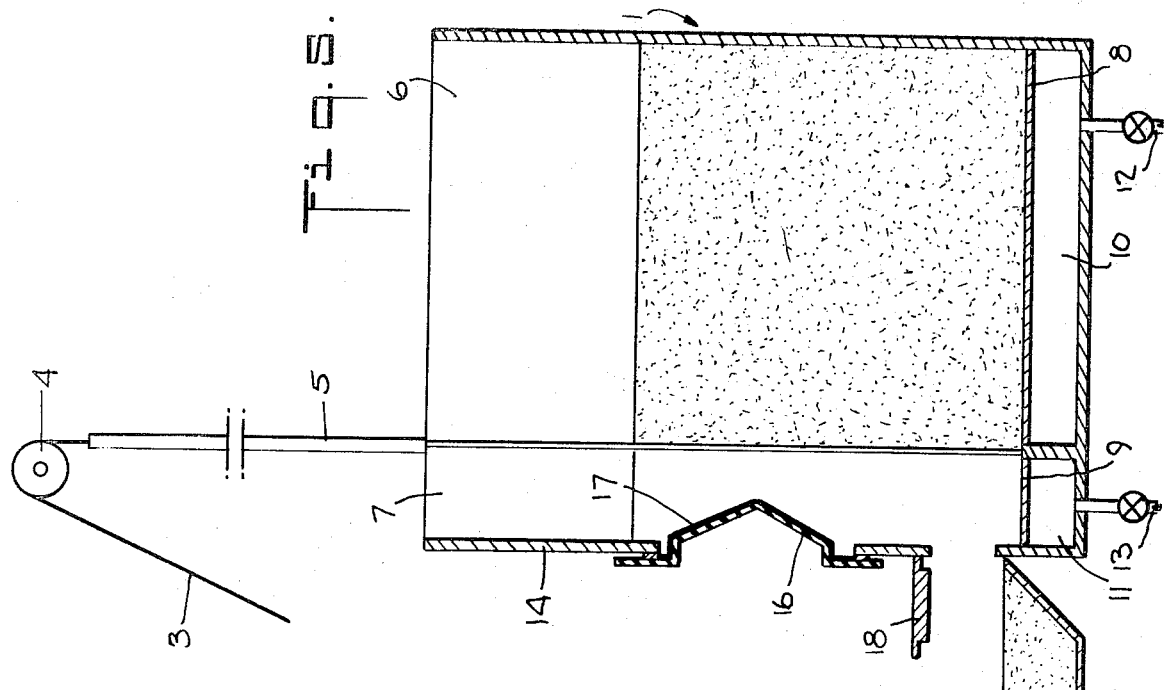
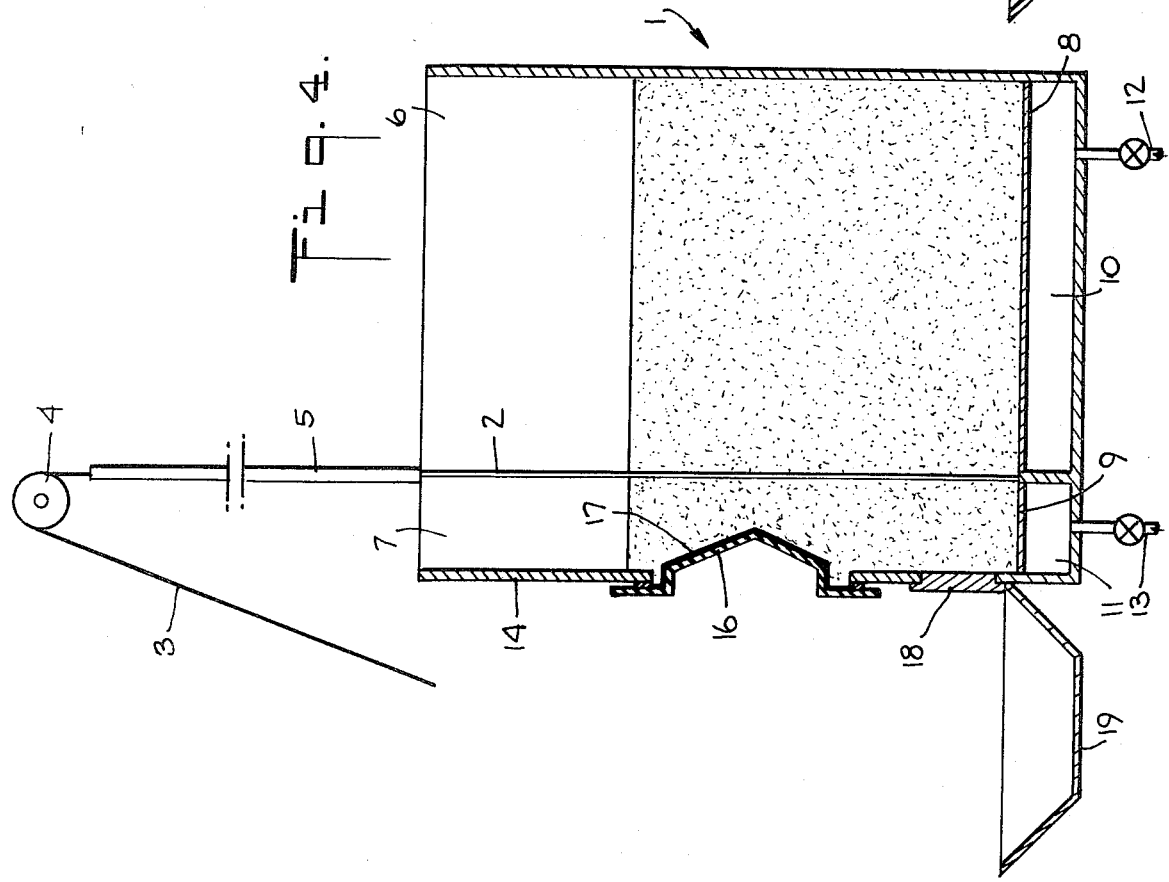

FLUIDIZED BED COATING APPARATUS

BACKGROUND OF THE INVENTION

1. Field of the Invention

The invention is an improvement in the old and well-known art of coating articles with powdered thermoplastic material. The common method of coating articles with powder in a fluidized bed has been to dip the preheated article in the bed for a certain length of time. This technique is disadvantageous in making coatings which are to be stripped off the article dipped because it is difficult to coat only one side of the article and if both sides are coated cooling the encapsulated part in water preparatory to stripping takes about eight times as long as cooling a part coated on one side only. The cooling is required so that the coating can be stripped without distortion. Another disadvantage is that to obtain a thin coating, dwell time of the part (mold) in the bed must be very short (approximately 2 seconds to obtain a coating of vinyl resin 0.030 inch thick); this necessitates very rapid dipping if the coating is to be uniform from top to bottom on the part; this is very difficult and expensive to achieve with large parts such as molds or forms used for making automobile floor mats (so-called auto mats).

The novel fluidized flow technique of the present invention overcomes the disadvantages of conventional fluidized coating techniques by (1) allowing only one side of a mold or part to be in contact with the fluidized powder by allowing the mold to form part of the wall of the bed and (2) permitting short dwell times without elaborate mold movement by moving the powder instead of the mold.

2. Description of the Prior Art

The following patents illustrate the present state of the fluidized coating art:

U.S. Pat. Nos:
  Vyverberg 2,759,450
  Gemmer 2,844,489
  Gemmer 2,974,059
  Dettling 2,974,060
  Dettling 2,987,413
  Davis 3,004,861
  Zimmerli 3,032,816
  Gemmer 3,063,860
  Croessant 3,085,034
  Gemmer 3,090,696
  McLean 3,099,583
  Gemmer 3,183,113
  Brooks 3,197,324
  Brooks 3,199,923
  Sharetts 3,233,582
  Angstadt 3,233,584
  Sharetts 3,257,116
  Weidenhammer 3,260,611
  Beike 3,364,053
  Stallard 3,532,531
  Kerr 3,537,875
  Christianson 3,572,290
British Pat. No. Knapsack-Griesheim 759,214

Of the patents listed above only Davis U.S. Pat. No. 3,004,861 merits discussion. This patent discloses a method and apparatus for applying protective coatings to a relatively large surface such as that of a ship (FIG. 1) or to the inner and outer surfaces of a tubular conduit (FIGS. 2, 3 and 4). In FIG. 1, Davis discloses an opening 22 in one side of the wall of a single fluidized bed container 10 and the fluidized thermoplastic material is applied to the surface 32 to be coated through this opening 22, relative movement being established between container 22 and surface 32 in order to obtain complete coverage. The teachings of Davis do not anticipate the present invention. Thus, in the present invention the article being coated completely closes and seals off the opening in the outer wall of the fluidized bed coating chamber and moreover is stationary because it is fixed in the wall. Other differences, which will be apparent to those skilled in the art from this specification, the accompanying drawings and the appended claims, distinguish the present invention from Davis.

SUMMARY OF THE INVENTION

The technique of the present invention, which has both apparatus and method aspects, typically utilizes a primary fluidized bed chamber and one or more secondary fluidized chambers adjacent to the primary chamber together with means for causing fluidized bed from the primary chamber to flow into the secondary chamber or chambers and for shutting off said flow. Each chamber is adapted to contain a separate fluidized bed with the powder-containing area separated from the fluidizing gas (typically air under pressure and heated so as to hold the thermoplastic particles in the bed at an elevated temperature which is significantly below the softening or melting point of the thermoplastic) introduction area (plenum chamber) by a porous plate material, typically made of porous polyethylene or any other suitable porous material, all in accordance with known practices.

The primary chamber and the secondary chamber or chambers can be divided by any means which allows the dividing wall or a portion of it to be open or closed so as to establish fluidized bed flow into the secondary chamber(s) and to close off the primary chamber from the secondary chamber(s). If desired, inflatable bags may be used in conjunction with a hole in a portion of separating wall common to both types of chambers to form a valving means, as shown in the embodiment of FIG. 6 of the drawings.

In accordance with the invention, each secondary fluidized bed chamber has a hole in its outside wall into which an article, such as a mold, can be inserted, thereby sealing the hole and exposing the inner face of the article to the coating action of the secondary fluidized bed. In addition, means is provided whereby the powder constituting the fluidized bed in each secondary chamber can be removed rapidly following completion of the coating and discontinuance of fluidizing conditions in each secondary chamber. In the preferred practice of the invention the powdered thermoplastic material thus recovered is recycled to the primary fluidizing chamber for use in subsequent coatings. The coated article is removed from the opening in the wall of the secondary chamber and typically, as in the manufacture of an auto mat, is cooled in known way to strip the coating from the mold or form.

The article to be coated is typically preheated somewhat, in accordance with conventional practice, prior to its insertion in the opening of the secondary chamber. Those skilled in the art can, with but little experimentation, readily determine the extent of such preheating of the article and the extent of heating of the fluidizing gas to achieve satisfactory coating of the article.

Adhesion of powdered thermoplastic to surfaces of the equipment, such as walls, valving means, partitions, etc. is readily prevented by use of suitable materials of construction and/or of release coatings, or by temperature control where appropriate, and is not a problem.

The wall of the secondary chamber which has the opening which receives the article to be coated is generally vertical or substantially vertical. A plurality of article-receiving openings can be provided in a given secondary chamber wall instead of only a single opening.

Any thermoplastic material commonly used in the fluidized bed coating art can be used. Any new thermoplastic material discovered in the future which lends itself to fluidized bed coating can be used in practicing the invention. The selection of the thermoplastic material constitutes no part of the invention.

As indicated above, the present invention makes it possible to build up a coating layer of the thickness required for an auto mat in an extremely short period of time. Heat transfer from the mold to the powder that strikes it is rapid since the mold is usually made of highly heat conductive metal. The result is rapid fusion and coalescence of the deposited particles is achieved. If desired, however, the coated mold can be heated additionally after removal from the opening and prior to the stripping step.

BRIEF DESCRIPTION OF THE DRAWINGS

In the accompanying drawings:

FIGS. 1 through 5 schematically portray equipment used in, and sequential steps of, one embodiment of the invention while FIG. 6 schematically portrays an embodiment of the invention adapted to mass production.

FIG. 1 shows a fluidized bed condition in the primary chamber at the start of the operation;

FIG. 2 shows the mold inserted in an opening in the wall of the secondary fluidized bed chamber;

FIG. 3 shows the fluidized bed divider lifted and the coating step in progress;

FIG. 4 shows the bed divider lowered; and

FIG. 5 shows the operation after coating is completed.

DESCRIPTION OF THE SPECIFIC EMBODIMENTS

Figure 6:
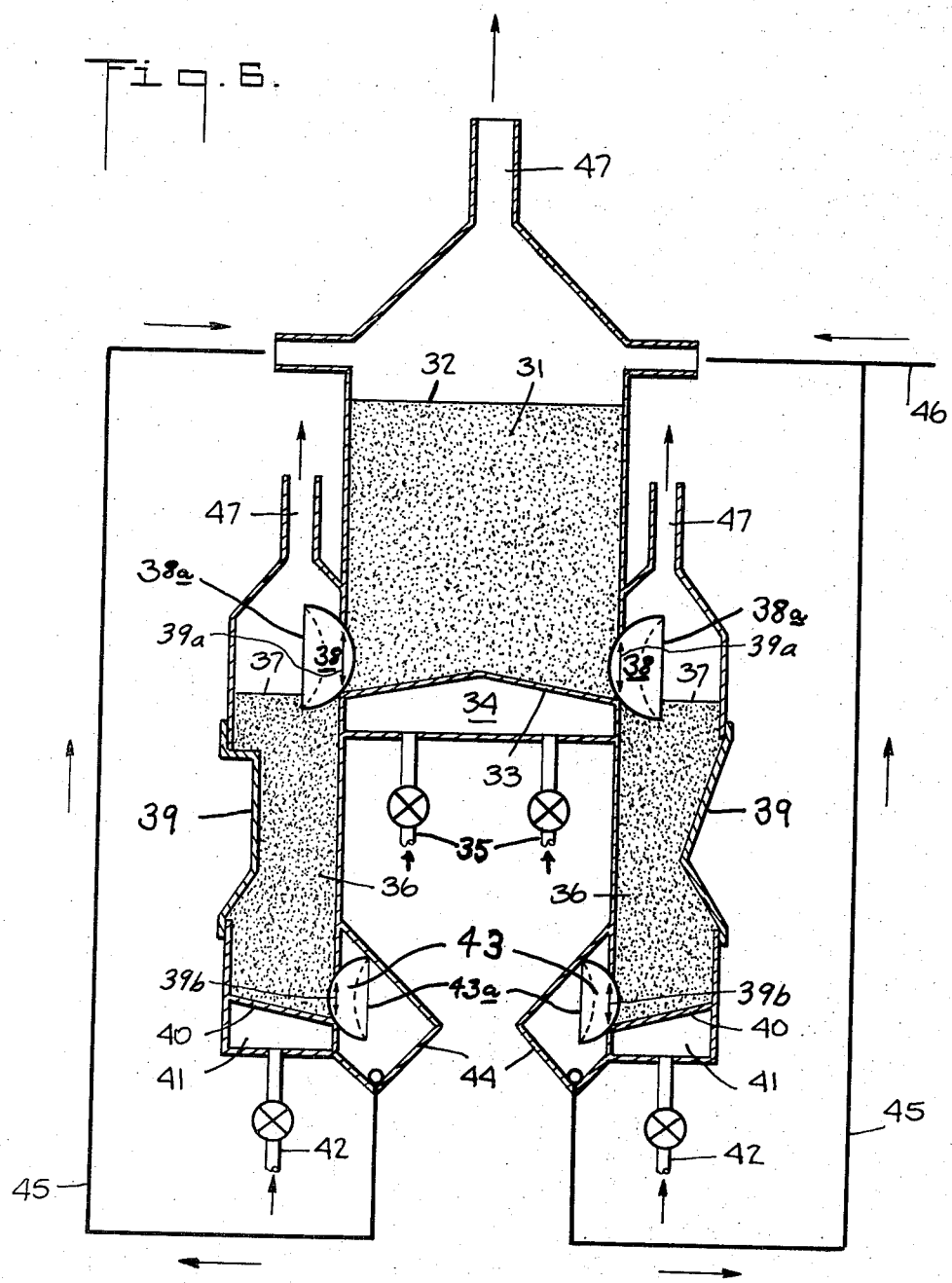

Now referring to FIGS. 1 through 5 of the drawings, the equipment shown comprises a cylindrical or square vessel 1 adapted to be separated by bed divider 2 which can be raised or lowered by cable 3 cooperating with sheave 4 and divider guide 5, forming when in the lowered position separate primary fluidized bed chamber 6 and secondary fluidized bed chamber 7 and when in the raised position (FIG. 3) allowing fluidized bed to flow from the primary chamber into the secondary chamber. Porous plates 8 and 9 extend across the lower portions of chambers 6 and 7 forming plenum chambers 10 and 11 in the bottom of vessel 1. Fluidizing gas under pressure is introduced into the plenum chambers by inlet conduits 12 and 13, each equipped with suitable valves for adjusting or discontinuing the introduction of such gas.

The outside wall 14 of the secondary chamber is provided with an opening 15 which is so designed as to sealingly receive a mold or other article 16 in such a way that the entire inner portion of the mold 16 which is to be coated is below the level of the fluidized bed in the secondary chamber at all times during the coating operation. The coating formed on the mold is indicated by heavy black line 17.

The wall 14 of the secondary chamber is also provided adjacent its lower portion with a suitable trap door 18 which is opened after coating and discontinuance of fluidizing conditions in the secondary chamber by cessation of introduction of fluidizing gas through conduit 13. The bulk of the thermoplastic powder which settles out on stopping fluidization falls into a powder bin 19 which is then emptied into fluidizing chamber 6 to be used in subsequent coating operations.

The mode of operation of the embodiment of FIGS. 1 to 5 will be obvious to those skilled in the art from the foregoing and from consideration of FIGS. 1 through 5 in that order. In FIG. 1, fluidization in the primary chamber 6 is established. In FIG. 2 the preheated mold 16 has been inserted in the opening 15 of the secondary chamber preparatory to a coating step. In FIG. 3 the divider 2 has been raised to fill the secondary chamber with fluidized thermoplastic. At this point fluidizing conditions for the secondary chamber are established by admission of gas through line 13 into plenum chamber 11 so that the powder is fluidized in both of chambers 6 and 7. The divider 2 is now lowered, the powder still being fluidized in both of chambers 6 and 7, and the coating of mold 16 proceeds, as shown in FIG. 4. After coating 17 is of sufficient thickness, admission of gas into plenum chamber 11 is discontinued causing fluidization in the secondary chamber to cease (FIG. 5). The thermoplastic powder settles out collecting on plate 9 in the bottom of secondary chamber 7. Trap door 18 is then opened allowing the bulk of the accumulated powder to flow into powder bin 19 whence it is returned to chamber 6. The coated mold is then removed from the wall, door 18 is closed, and the cycle is repeated.

The embodiment of FIG. 6 incorporates features adapting it for mass production. These features include raising the primary chamber to eliminate the powder which does not move in the embodiment of FIGS. 1 to 5, using a conical porous plate in this chamber, and using inflatable bags made of flexible, elastic, gas-impervious material such as rubber or other elastomer which inflate and deflate rapidly to separate the primary and secondary chambers and to empty the secondary chambers, respectively.

In FIG. 6 the central fluidized bed 31 having a powder level indicated at 32 is established in a central chamber which is elevated so as to be above the level of fluidized beds in the secondary chambers. The central chamber is provided with an inverted conical porous plate 33 below which is plenum chamber 34 fed by gas inlet conduits 35. A plurality of secondary fluidized beds 36 having a powder level indicated by 37 are established around and below bed 31. As many as ten or twelve of such secondary beds can be used with a single primary bed. Fluidized bed is caused to flow from the central chamber into the secondary chambers by deflating normally inflated bags 38 into the position shown in dotted lines until it reaches level 37 which is well above the top of the molds 39 (shown as of different configuration) disposed in the openings 39a in the outer walls of the secondary chambers. After the secondary beds have attained level 37, bags 38 are inflated to close off the secondary chambers from the primary chamber. The secondary chambers have their bottoms formed by sloping porous plates 40 below which are plenum chambers 41 into which fluidizing gas is introduced by inlets 42.

After coating is complete, the secondary fluidized beds are allowed to settle whereupon inflated bags 43 are deflated to their dotted line position to allow the accumulated powder to flow into powder recovery bins 44 from which the powder is recycled by lines 45 into the primary chamber. New powder is added via line 46. Air is exhausted via lines 47 to dust collectors (not shown) from the primary and secondary chambers in such a way as to minimize dust problems without causing undesirable loss of expensive thermoplastic powder.

Bags 38 and 43 comprise an envelope made of flexible, elastic, gas-impervious material such as rubber or other stretchable material which when inflated sealingly engages the edges, respectively, of an opening 39a in the wall separating the primary chamber and a secondary chamber or of an opening 39b in the wall separating a secondary chamber from a powder recovery bin and when deflated allows free fluid communication between the respective sections of the equipment. These bags are typically mounted on rigid vertical supports designated 38a and 43a, respectively, and are usually inflated by ordinary atmospheric air. Means for inflating and deflating these bags are not shown because the construction of such means would be perfectly obvious to those skilled in the art.

The principles and mode of operation of the embodiment of FIG. 6 are essentially the same as for the embodiment of FIGS. 1 through 5, and need not be detailed other than to point out that with this embodiment continuous fluidization is maintained in the primary chamber whereas fluidization in the secondary chambers is discontinuous and that air bags 39 are inflated except when filling secondary chambers with fluidized material and that bags 44 are inflated except when emptying powder accumulated on plates 41 into bins 45.

The term "thermoplastic material" is used herein in its normal art-accepted meaning to designate a polymeric, almost invariably resinous, solid organic material which upon being heated to an elevated temperature becomes fluent or molten and upon being cooled resumes its solid condition, this sequence being capable of being repeated many times without deleterious deterioration.

In practicing the invention numerous variations can be introduced. Thus coating powders can be changed between molds to make different products. Furthermore, powders can be changed so as to put more than one layer on a mold by purging the system and introducing a second powder of different color or other characteristics instead of recycling the original powder. Many other possibilities will be obvious to those skilled in the art.

We claim:

1. Apparatus for carrying out fluidized bed coating of articles with a particulate thermoplastic material comprising a primary fluidized bed chamber, means for continuously maintaining fluidized bed conditions therein, a plurality of secondary fluidized bed chambers, means for establishing, maintaining and discontinuing fluidized bed conditions in each of said secondary chambers independently of one another, an opening between the primary chamber and each of said secondary chambers such that the coating material may flow from one chamber to the other, and conduit and valve means for allowing free fluidized bed flow by gravity from said primary chamber into each of said secondary chambers and for closing off said primary chamber from each of said secondary chambers, said primary chamber being sufficiently elevated relative to said secondary chambers that fluidized bed can flow by gravity from said primary chamber into any of said secondary chambers when said valve means associated therewith allows said free fluidized bed flow, a wall of each of said secondary chambers having an opening adapted to temporarily receive, completely encircle and be sealed by an article so that the inwardly facing portion of the article is coated with particles from fluidized bed in a secondary chamber.

2. Apparatus as set forth in claim 1 wherein said valve means comprise flexible, inflatable bags which when inflated close said conduit means so as to prevent communication between the primary chamber and the secondary chambers and when deflated allows said free fluidized bed flow.

3. Apparatus as set forth in claim 2 further including powder receiving means located outside and adjacent to lower portions of the secondary chambers, and second conduit and valve means for allowing powder deposited in the lower portions of said secondary chambers upon discontinuance of fluidized bed conditions therein to flow by gravity therefrom into said powder receiving means and for closing off said secondary chambers from said powder receiving means.

4. Apparatus as set forth in claim 3 wherein said second valve means comprise flexible, inflatable bags which when inflated close said conduit means associated therewith so as to prevent flow from the secondary chambers and when deflated allow flow of powder from the secondary chambers into said powder receiving means.

* * * * *